United States Patent [19]

Robson

[11] 3,833,469

[45] Sept. 3, 1974

[54] PROCESS FOR THE PRODUCTION OF TECHNETIUM-99M FROM NEUTRON IRRADIATED MOLYBDENUM TRIOXIDE

[75] Inventor: John Robson, Stanwell Tops, New South Wales, Australia

[73] Assignee: Australian Atomic Energy Commission, New South Wales, Australia

[22] Filed: Aug. 30, 1972

[21] Appl. No.: 284,868

[30] Foreign Application Priority Data
Aug. 31, 1971   Australia.............................. 6121/71

[52] U.S. Cl. ........ 176/16, 250/106 T, 252/301.1 R, 424/1, 423/249
[51] Int. Cl.......................... C01f 13/00, C01f 15/00
[58] Field of Search................ 252/301.1 R; 176/16; 250/106 T; 23/252, 294; 424/1; 423/2, 49, 249, 605; 55/72

[56] References Cited
UNITED STATES PATENTS

| | | | |
|---|---|---|---|
| 2,860,948 | 11/1958 | Fried................................. | 23/294 X |
| 3,348,942 | 10/1967 | Davenport............................ | 423/49 |
| 3,362,795 | 1/1968 | Weisbeck.............................. | 23/294 |
| 3,382,152 | 5/1968 | Lieberman............................ | 176/16 |
| 3,436,354 | 4/1969 | Gemmill et al.............. | 252/301.1 R |

Primary Examiner—Carl D. Quarforth
Assistant Examiner—R. L. Tate
Attorney, Agent, or Firm—Eric H. Waters

[57] ABSTRACT

A process for producing solutions containing radioactive technetium-99m comprises irradiating molybdenum oxide in a nuclear reactor, heating the powdered product in a tube in a flowing gas stream at a temperature in the range 700°–950°C, passing the vaporised Tc-99m compound together with any vaporised molybdenum compound through a filter held at a temperature in the range 300°–700°C, condensing the Tc-99m compound in a condenser, taking-up the Tc-99m compound in a liquid, and removing the liquid containing the Tc-99m compound in a sterile container.

10 Claims, 1 Drawing Figure

PATENTED SEP 3 1974　　　　　　　　　3,833,469
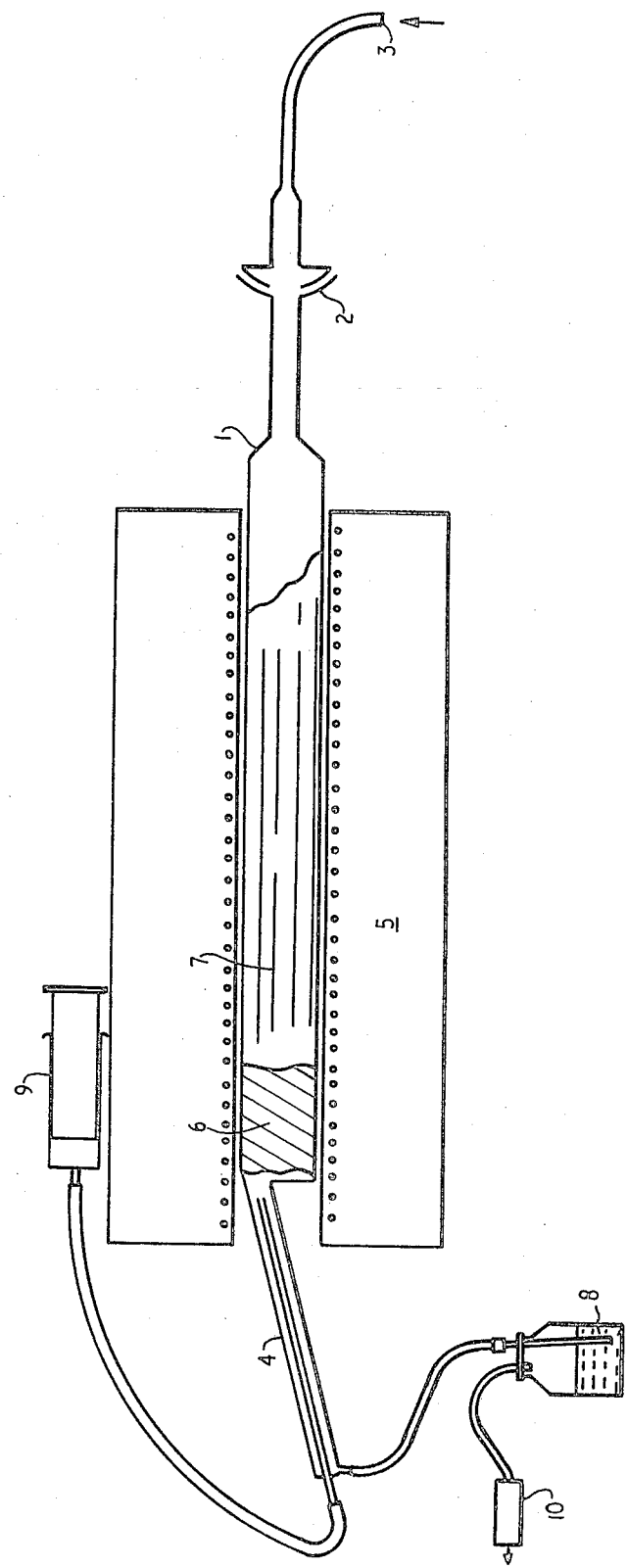

PROCESS FOR THE PRODUCTION OF TECHNETIUM-99M FROM NEUTRON IRRADIATED MOLYBDENUM TRIOXIDE

The invention relates to a process for producing high purity solutions of radioactive technetium from relatively cheap, low specific activity irradiated molybdenum trioxide. This process provides pertechnetate solutions at concentrations up to 20 curies per ml which are suitable starting material for conversion to a variety of labelled compounds for use in medical research and diagnosis and in a variety of industrial applications. The short half-life (6 hr), radiation emission, and radiochemistry of technetium-99m make it an almost ideal radionuclide for medical scintigraphy.

Technetium-99m of high specific activity has been obtained previously by activating molybdenum-98 enriched target material in a high neutron flux, but many laboratories do not have available the isotopically-enriched materials nor high flux reactors.

The alternative method of production of carrier-free molybdenum-99, which is the parent of technetium-99m, from the products of fission of uranium-235 has been up to now the only practical way of producing adequate amounts of material. The basis for this type of process is that a suitable compound of molybdenum-99 is adsorbed onto a substrate, e.g., alumina, contained in a column and a solvent is passed through the column to preferentially elute or dissolve the technetium-99m. The product solution invariably contains detectable amounts of molybdenum-99 and other metal ions, such as aluminium, which are undesirable impurities. Furthermore, this process for the separation of fission product molybdenum from uranium and the many other products of fission involves elaborate equipment for the efficient and safe handling of substantial amounts of radioactivity, and large amounts of radioactive waste solutions are produced.

An improved process disclosed by W. J. Gemmill et al. in U.S. Pat. No. 3,436,354 in 1969 to obtain technetium-99m solutions of high purity required the many separate stages of dissolution of starting compound, solvent extraction, drying of the solvent, evaporation of the solvent, and re-dissolution of the residue.

In 1937, Perrier and Segré (J. Chem. Phys., 5, 712 (1937)) reported the volatility of the oxide of technetium ($Tc_2O_7$) in studies in which they covolatilised technetium and rhenium. Morgan and Sizeland (United Kingdom Atomic Energy Authority Report AERE No. C/M 96 (1950) used this characteristic to produce tracer amounts of technetium-99m from irradiated molybdenum oxide, but they made no special effort to separate the technetium product from molybdenum contamination which would have rendered the product unusable for medical purposes.

More recently Tachimori, Nakamura and Amano (J. Nucl. Sci. Tech., 8, 295 (1971) studied the yield and mechanism of production of small quantities of technetium-99m from irradiated molybdenum oxide. They stated that "in order to realize a practical dry generator, some means must be devised which transfers irradiated $MoO_3$ backwards and forwards alternatively (sic) and repeatedly, isolating Tc-99m at every cycle." It therefore appears that the authors did not consider that they had at that time a practical generator available for repeated use.

We have discovered that in order to obtain large amounts of technetium-99m repeatedly from a dry generator it is necessary to operate the generator at a temperature in excess of 700°C, and to use a filter held at a suitably lower temperature to obtain the high purity which is essential for medical use of the product.

The process which we disclose herein is believed to be a major development in the art. Its advantages lie in the comparative simplicity of the equipment, the reliability of the process, the high radionuclidic purity which is well above the standard required for medical application, the high radioactive concentration which can be obtained from low-specific activity molybdenum-99 (which can be made in low flux reactors), and the filter and furance tube or boat which, together with the residual molybdenum oxide, are the only radioactive waste. Furthermore, a major failure of the equipment during the process does not result in a large loss of the parent material as is invariably the case for wet systems. The equipment and procedure in the final stage of the process disclosed herein enable a high degree of integrity against bacterial influx to be maintained, which is an essential requirement for medical use.

The process comprises the steps of:
a. irradiating molybdenum oxide in a nuclear reactor, b. pulverising the product containing technetium-99m and molybdenum oxide from the reactor to give a powder, c. placing the powder containing the technetium-99m and the molybdenum oxide in a tube, or in a boat in a tube, d. heating the powder containing the technetium-99m in the tube in a flowing stream of gas at a temperature in the range 700°–950°C, e. passing the vaporised technetium-99m compound together with any vaporised molybdenum compound through a filter held at a temperature in the range 300°–700°C, f. condensing the technetium-99m compound in a condenser, g. taking up the technetium-99m compound from the condenser with a suitable liquid, h. removing the liquid containing the technetium-99m compound under sterile conditions in a sterile container.

The several steps (a) to (h) are discussed in general terms below and examples are given of the preferred materials and the quantities required to carry out the process disclosed.

This description should be read in conjunction with the accompanying drawing which is a diagrammatic representation of one form of suitable equipment.

Step (a) - Irradiation

The basic nuclear reaction for the process is

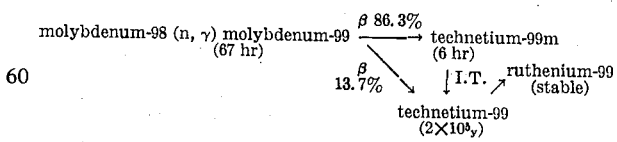

A molybdenum compound is irradiated in a nuclear reactor, and a variety of compounds are suitable in principle, e.g., molybdenum trioxide, molybdic acid, molybdenum metal. The preferred compound is free-flowing molybdenum trioxide of suitable quality such as A.R. or equivalent or higher quality, and this is subjected in a typical experiment to a neutron flux of between $5 \times 10^{13}$ and $8 \times 10^{13}$ n cm$^{-2}$ sec$^{-1}$, and activated close to saturation.

Comparative irradiations in facilities inside and outside the core of a materials testing reactor (HIFAR) have indicated that the activation cross-section is approximately 0.12 barns in hollow fuel element positions and approximately 0.03 barns in positions which are located on the periphery of the $D_2O$ tank. Two cans each containing 60–90 g of molybdenum trioxide powder are irradiated for about two weeks in a high flux region of the reactor. The resulting gross activity upon withdrawal averages around 200 Ci of molybdenum-99. This amount can be handled in suitable facilities and allows the daily demand (may be typically approximately 1 to 10 curies of technetium-99m) to be met at the end of a series of separation cycles.

Step (b) - Post-irradiation preparation

The powder sinters somewhat during irradiation and the product is unloaded from the cans in a suitable shielded facility and pulverised or crushed to give a relatively free-flowing powder before charging into the furnace tube.

Step (c) - Charging of the tube and description of equipment

A diagramatic representation of one form of suitable equipment is given in FIG. 1 and the following dimensions and materials are described by way of example. A furnace tube 1 of silica, 3 cm diameter and 25 cm long, has a spherical ground silica joint 2 at the end of which a supply 3 of gas is connected, and an air condenser 4, similarly of silica, at the opposite end. The condenser is 1 cm diameter and 9 cm long and is inclined at an angle to the main part of the tube. The equipment may also be constructed of nickel or 50 percent nickel 50 percent chromium alloy, or similar alloys or from other ceramics as well as silica. The tube and part of the condenser are held inside a tube furnace 5 which is conveniently heated electrically.

The tube is charged firstly with a plug or filter 6, preferably of silica wool but which may be stainless steel, nickel 50 percent nickel — 50 percent chromium or similar alloys, or other ceramics, and the sample 7 of about 120–180 g of irradiated powdered molybdenum trioxide with an activity of about 200 curies is added to the tube. The tube is then inserted into the furnace and the spherical joint is connected to a supply of gas, which is preferably oxygen. In the horizontal position the powder usually occupies about threequarters of the free volume of the tube. The powdered or crushed material may also be placed in a silica or metal boat in the furnace tube.

The inner tube of the condenser section is connected by a length of tubing, for example plastic, to a hypodermic syringe, which may conveniently be outside the main biological shielding which is usually placed around the equipment to protect the operators from the radiation emitted. The outer part of the condenser is connected through a suitable tube and hypodermic needle fitting to a container, for example a rubber-capped vial, which is vented through a sterile filter to the atmosphere. A volume of a suitable solvent, for example isotonic saline solution, is contained in the vial.

Step (d) — Operation of the generator - heating stage

The basic operation of the generator consists in heating the irradiated molybdenum trioxide powder containing the technetium-99m in a stream of a carrier-gas to a temperature at which there is a release of a technetium-99m compound. Under the flow of the carrier-gas the technetium-99m compound is removed through the filter plug and allowed to condense in the cool part of the condenser.

The release of technetium-99m from heated irradiated molybdenum oxide takes place extremely slowly at 200°C and is still slow at the boiling point, 310°C, of the well-known oxide, $Tc_2O_7$. There is an increased release as the temperature is raised, and at the meeting point of molybdenum trioxide, 797°C, the release is rapid. However, at this temperature the vapour pressure of molybdenum oxide is significant, approximately 8 mm Hg (Handbook of Chemistry and Physics, 51st Edition, C.R.C., 1970), and some of this compound will vaporise with the technetium oxide. We therefore pass the vapours mixed with the carrier-gas through a filter plug to substantially remove the molybdenum oxide and/or other volatile molybdenum compounds and this step is described further below.

The practical operation of the presently described stage is achieved by passing a slow flow of carrier-gas, which is preferably oxygen, through the tube such that a steady stream of bubbles are produced from the end of the tube which dips into the solvent which is contained in the vial 8 connected to the outer part of the condenser. The furnace is allowed to heat up over a period of, for example, 30 minutes to a nominal temperature of 700°–800°C in the first "milking" of, or removal of technetium-99m from, the generator. The temperature is usually measured with a thermocouple located near the centre of the furnace between the tube and the furnace wall. The furnace tube is maintained at a temperature of 700°–800°C for the first "milking" for about 15 minutes during which time a quantity of technetium-99m of about 20 curies is volatilised into the condenser.

As the parent molybdenum-99 decays, both the temperature and the heating time are increased to offset the loss in activity, and to obtain an approximately steady output of technetium-99m for each "milking." The useful life of such a generator operated in this way is about 7 days, at the end of which the furnace temperature is maintained at about 900°C–950°C for a time of about 1 hour. A temperature in excess of 950°C is not convenient practically because of the then high volatility of molybdenum oxide and the consequent rapid blockage of the filter described below.

Step (e) — Operation of the generator — filter stage

At temperatures close to, or greater than, the melting point, 797°C, of molybdenum oxide a significant quantity of molybdenum oxide is likely to contaminate the technetium-99m product unless steps are taken to reduce or prevent this. We have discovered that a porous plug, filter, or barrier, place between the heated molybdenum oxide and the condenser reduces or prevents the contamination of the technetium-99m product with molybdenum oxide and/or volatile compound of molybdenum and other elements of similar volatility properties.

The porous plug, filter, or barrier is held at the end of the furnace such that it is at a temperature greater than the boiling point (310°C) of the well known compound $Tc_2O_7$, but lower than the temperature of the centre part of the furnace (which may be varied conveniently in the range 700° to 950°C as discussed in Step (d)). The practically useful temperature range for operation of the plug, filter or barrier is therefore 310°-700°C. At temperatures lower than about 300°C there is the possibility of the yield of the technetium-99m product being reduced, whereas at higher temperatures than 700°C it will not effectively hold back the volatile compounds of molybdenum or other metals with similar volatility properties.

Whilst any metal, non-metal, or ceramic porous plug, filter, or barrier may in principle be used in this temperature range to ensure that a high-purity technetium-99m product is obtained, silica wool is preferred. This material is relatively cheap, is stable at the temperature of operation of the furnace, and relatively unattacked by the volatile compounds in the system. However, examples of other materials which may be used are certain types of stainless steel wool or mesh, and wool, fibre or porous bodies of alumina or other ceramics stable at the required temperature.

Treatment of the vapours obtained by heating the powdered irradiated molybdenum oxide in the tube in this way will give a technetium-99m product substantially free from all impurities in the molybdenum oxide. The amount of molybdenum-99 in the technetium-99m product is <0.01% 24 hours after separation.

In most conventional electrically heated furnaces the temperature gradient at the end of the furnace can be quite steep, for example 200°C/cm over the range 300°-700°C, and it is convenient to make provision for placing the furnace tube as described in approximately the same position with respect to the furnace to ensure reproducible operation of the porous plug, filter, or barrier. This reproducibility may be achieved by having tubes made with closely similar dimensions and having an index mark inscribed on each tube and lining this up with the end of the furnace before each milking.

Step (f) — Condensation of the technetium-99m

The vapour of the technetium-99m compound enters the condenser after passing through the porous plug, filter or barrier, and condenses on the surfaces. It is likely that the principal technetium compound present is the oxide $Tc_2O_7$, which has a vapour pressure of about $10^{-3}$ mm Hg at room temperature. The specific activity of the technetium-99m (as $Tc_2O_7$) is about $3 \times 10^6$ Ci/g, so that the amount of technetium-99m collected in a typical run may be about $1 \times 10^{-6}$ g. It might be expected that no $Tc_2O_7$ would be condensed since the $1 \times 10^{-6}$ g would not saturate the vapour phase even at this temperature. However, substantially all of the technetium-99m does condense out under these conditions. A reason for this could be that the technetium-99m is readily physically adsorbed on the condenser surface.

Step (g) — Taking up the technetium-99m compound in a liquid

After the irradiated molybdenum oxide has been heated for an appropriate time at an appropriate temperature, the electrical or other heating of the furnace is stopped, and the furnace is allowed to cool down. The flow of oxygen or other gas is continued through the furnace. The condenser part of the equipment may be partly withdrawn from the furnace to increase the rate of cooling of the hot part of the condenser, and a convenient way of doing this is to have the furnace movable.

After a short cooling period of about 5 to 30 minutes, the carrier-gas supply is stopped and the end sealed or isolated with a suitable tap. A volume of a suitable solvent, which was placed at the start of the operations in the vial connected to the condenser, is then sucked up into the condenser by suction applied with the hypodermic syringe 9, or other similar device, connected to the inner tube of the condenser The solvent or liquid used in this step is dictated by the end-use intended for the technetium-99m product. One example is sterile pharmaceutically acceptable saline solution for use in medical diagnostic investigations. Such solutions are well-known in the art.

The technetium-99m compound, probably in the form of the oxide $Tc_2O_7$, is usually substantially taken up (and probably dissolved) at the first contacting of the liquid with the condensed material on the surface of the condenser. However, it is usual to apply slight pressure from the hypodermic syringe to expel the liquid into the sterile vial or container, and to repeat the suction two or more times to ensure that substantially all of the recoverable technetium-99m is recovered.

The volume of the liquid can readily be chosen between about 5 and 25 ml by the use of standard vials of nominally 12 and 30 ml capacity, and this choice, coupled with the selection of the time and temperature of operation of the generator, and the amount and specific activity of the molybdenum oxide charged to the generator, allows a wide choice in the final specific activity of the product, for example from 20 millicuries/ml to 20 curies/ml. A preferred activity level for convenient use is 1 curie/ml, and a convenient total amount to handle is 5-20 curies in one batch. This process enables a substantial part of the technetium-99m in a batch of several hundred grams of irradiated molybdenum oxide to be obtained pure in a volume as small as 5 ml.

When solutions or dispersions of technetium-99m are required for research or other purposes to be in other liquids, for example in organic solvents, the procedure outlined can equally well be used.

Step (h) — Removal of the Liquid Containing the Technetium-99m

In a system of the nature described above it is possible to commence with a sterile liquid in the vial or container and to maintain sterile conditions during the process by virtue of the fact that the sterile filter 10 on the outlet of the vial or container prevents ingress of contaminants; the carrier-gas is effectively sterilised at the temperatures obtaining in the furnace tube, and the remaining parts of the simple equipment can be readily sterilised at the commencement of the process or connected as presterilised units, for example, hypodermic syringe, needle, tubing

GENERAL CONSIDERATIONS

It is believed that the technetium is produced by the process described initially in the form of the volatile oxide, $Tc_2O_7$, and that this may later be present in the liquid saline solution as the pertechnetate ion ($TcO^-_4$). However, the exact compounds present are not important because the technetium-99m is present in a usable form.

The process as described may be operated conveniently twice, or more, times daily until the end of a cycle of about 10-14 days' duration, when it is then more convenient to replace the generator with a new batch of irradiated molybdenum oxide in a new tube, or boat in a tube. The residual molybdenum oxide, which is still somewhat radioactive, is then disposed of, together with the silica tube, the boat if used, and the silica wool plug, filter, or barrier, after the tube has been disconnected from the rest of the equipment. There is no other effluent or waste from the process.

The process can be operated reliably on a routine basis, but even if there should be a catastrophic breakage of the tube containing the molybdenum oxide, or the condenser section, or if the furnace over-heated and vaporised a substantial amount of molybdenum oxide into the porous plug, filter or barrier this cannot result in a complete loss of the radioactive material. The material can easily be removed from a broken tube and re-loaded into another tube in a suitable shielded cell. The usual precautions for protection against radiation should be used in carrying out the process of the invention.

Particular features of this process are the purity of the resulting technetium-99m produced and its high specific activity (20 curies/ml is easily achieved). Regular quality control tests have demonstrated that the molybdenum content of the product is well below the values which are considered to be desirable for medical diagnostic use, i.e., < 0.01 percent molybdenum-99 (24 hrs after separation) and < 50 ppm inactive molybdenum.

Under the conditions which we have described the quantity of molybdenum-99 produced will meet the demands for technetium-99 m at the end of a 14-day cycle in which repeated milkings are carried out. The large excess available early in the cycle would present a problem in dispensing if it were all separated, so that we have developed the practice of operating initially at a lower temperature and for a shorter time than towards the end of the period when a higher separation efficiency is obtained by use of a higher temperature and a longer time. This has the added advantage of keeping the volatilisation of the molybdenum oxide to a minimum, and the likelihood of blockage of the porous plug, filter or barrier to a minimum.

What I claim is:

1. A process for producing solutions of technetium-99m which comprises the steps of:
   a. irradiating molybdenum oxide of suitable quality in a nuclear reactor,
   b. pulverizing the product containing technetium-99m and molybdenum oxide from the reactor to a powdered form,
   c. placing the powdered product containing the technetium-99m and the molybdenum oxide in a tube or in a boat within the tube,
   d. heating the powder containing the technetium-99m and molybdenum oxide in the tube in a flowing stream of carrier gas at a temperature in the range 700°–950°C,
   e. passing the vaporized technetium-99m compound together with any vaporized molybdenum compound into a filtering means held at a temperature in the range 300°–700°C,
   f. condensing the technetium-99m compound in a condenser,
   g. taking up the technetium-99m compound from the condenser in a liquid, and
   h. removing the liquid containing the technetium-99m compound in a sterile container, 2. The process of claim 1 wherein the tube or boat containing the powdered irradiated material is made from a material selected from the group consisting of nickel, 50 percent nickel-50 percent chromium alloy, and a ceramic material, capable of withstanding operation in the temperature range 700°–950°C.

3. The process of claim 1 wherein the flowing carrier gas stream of step (d) is an oxygen-containing gas.

4. The process of claim 1 wherein the filtering means of step (e) is made from a material selected from the group consisting of stainless steel, nickel, 50 percent nickel-50 percent chromium alloy, and a ceramic material.

5. The process of claim 4 wherein the filtering means of step (e) is silica wool.

6. The process of claim 1 wherein the condenser is made from a material selected from the group consisting of nickel, 50 percent nickel-50 percent chromium alloy, and a ceramic material.

7. The process of claim 6 wherein the condenser is of silica.

8. The process of claim 1 wherein the liquid of step (g) is a pharmaceutically acceptable liquid.

9. The process of claim 8 wherein the liquid of step (g) is a pharmaceutically acceptable isotonic saline solution.

10. The process of claim 3 wherein the flowing carrier gas stream of step (d) is oxygen.

* * * * *